(12) United States Patent
Park

(10) Patent No.: US 8,459,426 B2
(45) Date of Patent: Jun. 11, 2013

(54) SYNCHRONIZING DEVICE FOR TRANSMISSION

(75) Inventor: Jong Yun Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 145 days.

(21) Appl. No.: 12/956,986

(22) Filed: Nov. 30, 2010

(65) Prior Publication Data

US 2011/0272234 A1 Nov. 10, 2011

(30) Foreign Application Priority Data

May 10, 2010 (KR) .......................... 10-2010-0043476

(51) Int. Cl.
*F16D 23/06* (2006.01)

(52) U.S. Cl.
USPC .................................................. 192/53.341

(58) Field of Classification Search
USPC ................ 192/53.341–53.343, 53.36, 53.361
See application file for complete search history.

(56) References Cited

U.S. PATENT DOCUMENTS

| 2,221,894 | A | * | 11/1940 | White | 192/53.341 |
| 4,132,298 | A | * | 1/1979 | F'Geppert | 192/53.342 |
| 4,349,090 | A | * | 9/1982 | Griesser | 192/53.362 |
| 4,425,990 | A | * | 1/1984 | Griesser | 192/53.362 |
| 4,566,568 | A | * | 1/1986 | Yant | 192/53.341 |
| 2011/0315500 | A1 | * | 12/2011 | Park | 192/53.341 |

FOREIGN PATENT DOCUMENTS

| JP | 11-210778 A | 8/1999 |
| KR | 10-2005-0108065 A | 11/2005 |

\* cited by examiner

*Primary Examiner* — Richard M. Lorence

(74) *Attorney, Agent, or Firm* — Morgan, Lewis & Bockius LLP

(57) ABSTRACT

A synchronizing device for transmission having a clutch hub disposed to a shaft and a clutch hub groove formed thereto, a sleeve splined and connected to an external side of the clutch hub for being capable of moving along axial direction of the shaft, a blocking key disposed to the clutch hub groove, and a clutch gear disposed coaxial to the shaft, may include a blocker ring disposed to slidably touch a cone portion formed to the clutch gear, wherein a blocking key receiving portion for supporting the blocking key may be formed to the blocker ring.

5 Claims, 4 Drawing Sheets

SYNCHRONIZING DEVICE FOR TRANSMISSION

CROSS-REFERENCE TO RELATED APPLICATION

The present application claims priority to Korean Patent Application No. 10-2010-0043476 filed in the Korean Intellectual Property Office on May 10, 2010, the entire contents of which is incorporated herein for all purposes by this reference.

BACKGROUND OF THE INVENTION

1. Field of the Invention

The present invention relates to a synchronizing device for transmission. More particularly, the present invention relates to a synchronizing device for transmission which has a blocking key receiving portion formed to a blocker ring and reduces numbers of elements and reduces total length of the device.

2. Description of Related Art

For example, a double clutch transmission transfers torque input from an engine selectively to input shafts using two clutches, and shifts and outputs using gears disposed to the input shafts.

The double clutch transmission embodies a high speed compact transmission higher than a fifth speed, and also may embody an AMT (Auto Manual Transmission) which may not need manual operation using two clutches and a synchronizing device.

The synchronizing device for the double clutch transmission is known from KR 2009-0127141 (HOERBIGER SYNCHRONTECHNIK GMBH & CO.KG).

In the disclosed patent application, as shown in FIG. 4, a blocking unit 100 includes a blocking key 102, an indexing key 104 guiding movement of the blocking key 102, a spring 106 elastically supporting the blocking key 102 to radial direction, and a blocker ring 110 (also named a synchronizer ring) supporting the indexing key and embodiments for operations of elements are disclosed.

In this disclosure, synchronous force is generated from contact of the blocking key 102, the indexing key 104 and the blocker ring 110 not contact of the sleeve 112 and the blocker ring 110.

However, the disclosed patent application has the indexing key for guiding movement of the blocking key so that elements numbers and manufacturing cost are increased and also requiring space along axial direction for the indexing key may cause increasing length of devices.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a synchronizing device for transmission having advantages of having a blocking key receiving portion formed to a blocker ring, which replaces a conventional indexing key and a blocker ring, and reduces numbers of elements and reduces total length of the device.

In an aspect of the present invention, the synchronizing device for transmission having a clutch hub disposed to a shaft and a clutch hub groove formed thereto, a sleeve splined and connected to an external side of the clutch hub for being capable of moving along axial direction of the shaft, a blocking key disposed to the clutch hub groove, and a clutch gear disposed coaxial to the shaft, may include a blocker ring disposed to slidably touch a cone portion formed to the clutch gear, wherein a blocking key receiving portion for supporting the blocking key may be formed to the blocker ring.

The blocking key receiving portion may include support protrusions protrudingly formed in an axial direction of the shaft as a pair with a predetermined distance therebetween and a receiving space formed between the support protrusions for supporting the blocking key.

The blocking key receiving portion may further may include a protrude portion for guiding the blocking key receiving portion into the clutch hub groove, wherein the protrude portion protrudes from an outer circumference surface of the blocker ring in a radial direction thereof between the support protrusions.

The support protrusions may include a slanted surface formed at inner side thereof.

The slanted surface may be slanted in a predetermined angle with respect to a radial axis of the blocker ring.

The blocker key may have slanted sides at a lower portion thereof in correspondence with the slanted surface of the support protrusions.

The present invention according to the example embodiment may reduce numbers of elements by integration of an indexing key and a blocker ring.

Also, the present invention according to the example embodiment may reduce manufacturing cost and total length of the device.

Vibration or clearance problems caused between an indexing key and a blocking key may be prevented.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
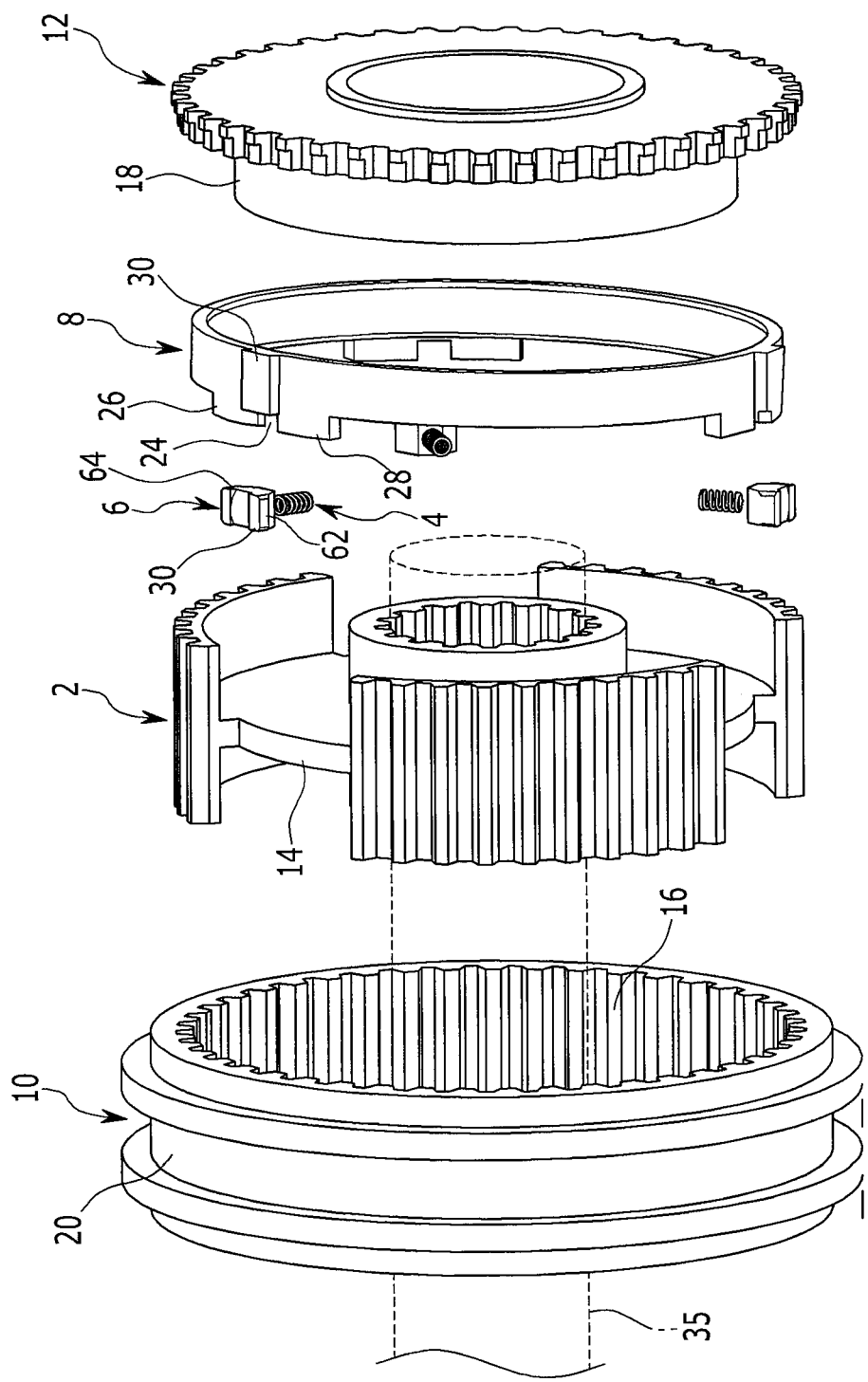
FIG. 1 is an exploded perspective view of a synchronizing device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

For better comprehension and ease of description, descriptions of obvious elements will be omitted, and the same or similar elements will be explained with the same reference numbers.

Figure 2:
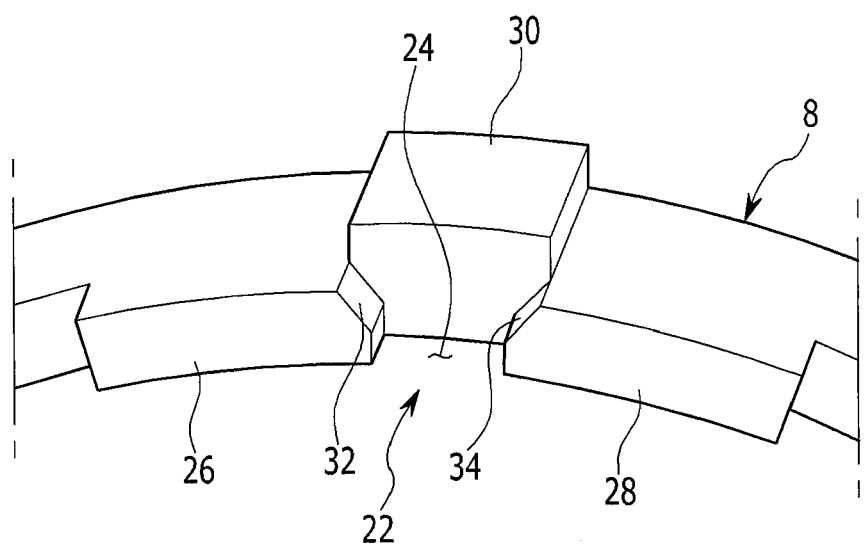
FIG. 2 is a partial enlarged view of a blocker ring of a synchronizing device according to an exemplary embodiment of the present invention.
Figure 3:
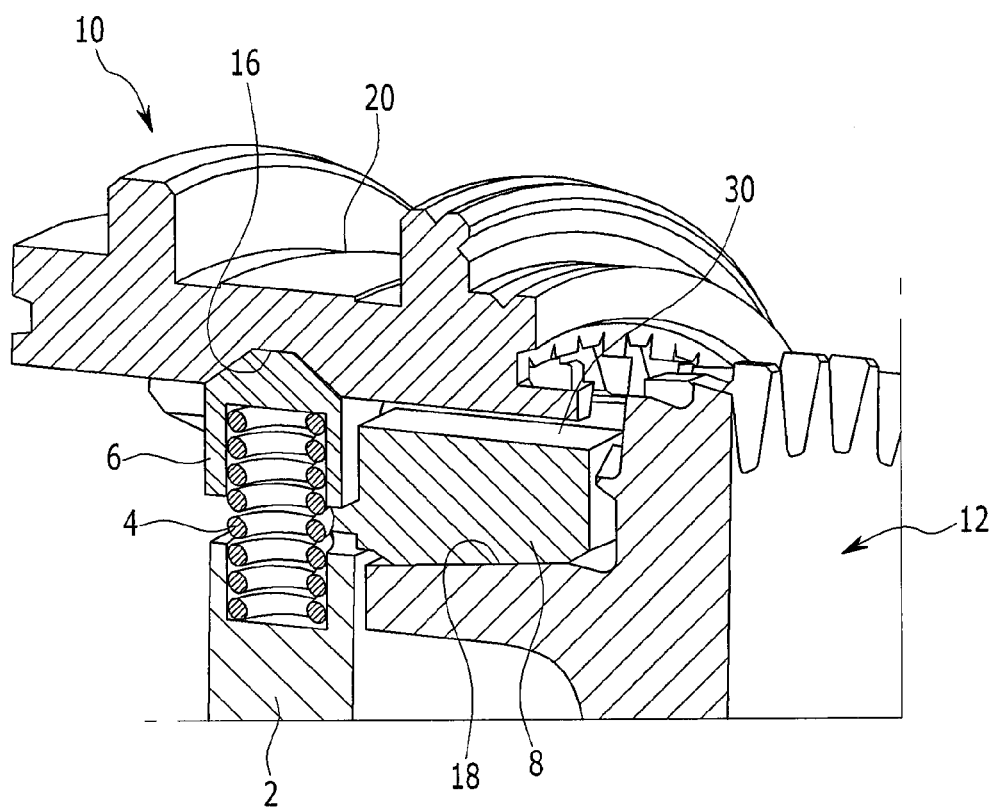
FIG. 3 is a partial cross-sectional view of a synchronizing device according to an exemplary embodiment of the present invention.
Figure 4:
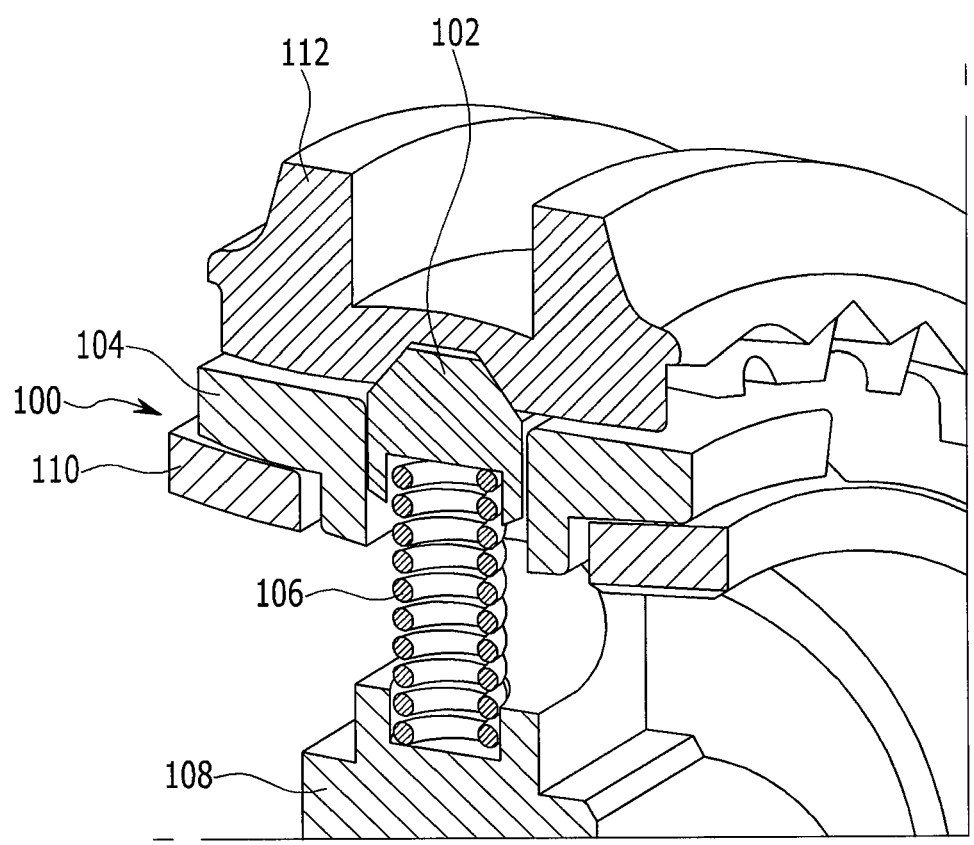
FIG. 4 is a partial cross-sectional view of a synchronizing device of a conventional art.

As shown in FIG. 1 to FIG. 3, a synchronizing device for transmission according to an exemplary embodiment of the present invention includes a clutch hub 2, a blocking key 6, a blocker ring 8, a sleeve 10 of which a locking groove 16 is formed thereto, and a clutch gear 12 of which a cone portion 18 formed thereto.

The clutch hub 2 is splined and connected to a shaft 35 and a plurality of clutch hub groove 14 is formed to an external circumference of the clutch hub 2.

The blocking key 6 is disposed to the clutch hub groove 14 and the spring 4 is disposed between a bottom of the clutch hub groove 14 and the blocking key 6 for elastically supporting the blocking key 6 toward the locking groove 16 formed to an interior surface of the sleeve 10.

The blocker ring 8, commonly named a synchronizer ring, is disposed to a side of the clutch hub 2, and rubbed and synchronized with the cone portion 18 of the clutch gear 12 when the sleeve 10 moves toward the clutch gear 12.

The sleeve 10 is splined and engaged to an external circumference of the clutch hub 2, moves along axial direction of the shaft 35 by a shift fork inserted into a sliding groove 20 formed an external surface of the sleeve 10, and then the sleeve 10 is engaged with the clutch gear 12.

The synchronizing device according to the exemplary embodiment of the present invention, as shown in FIG. 2, includes a blocking key receiving portion 22 for supporting and guiding the blocking key 6 formed to the blocker ring 8.

The blocking key receiving portion 22 includes support protrusions 26 and 28 protrudingly formed along axial direction of the shaft 35 as a pair and a receiving space 24 formed between the support protrusions 26 and 28 for supporting and guiding the blocking key 6.

The blocking key receiving portion 22 further includes a protrude portion 30 for guiding the blocking key receiving portion 22 into the clutch hub groove 14.

The support protrusions 26 and 28 include a slanted surface 32 and 34 formed thereto for the blocking key 6 to be stably supported.

The blocking key 6 also has slanted sides 62 and 64 to be stably supported onto the slanted surface 32 and 34 of the support protrusions 26 and 28 respectively.

The protrude portion 30 may allow easy assembling by checking positions of the blocker ring 8 and stable states after assembling.

Also, blocking key receiving portion 22 may contact a side of the blocking key 6 sufficiently when the blocking key 6 moves along the axial direction of the shaft 35.

And thus, synchronous force may be increase by contact between the blocking key 6 and the slanted surface 32 and 34.

As described above, the synchronizing device for transmission according to the exemplary embodiment of the present invention includes the blocking key receiving portion 22 formed to the blocker ring 8 without an indexing key so that numbers of total elements may be reduced.

Manufacturing cost and total length of the device may be reduced.

And also, vibration or clearance problems caused between an indexing key and a blocking key may be prevented.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A synchronizing device for a transmission having a clutch hub disposed to a shaft and a clutch hub groove formed thereto, a sleeve splined and connected to an external side of the clutch hub for being capable of moving along axial direction of the shaft, a blocking key disposed to the clutch hub groove, and a clutch gear disposed coaxial to the shaft, the synchronizing device comprising:
   a blocker ring disposed to slidably touch a cone portion formed to the clutch gear;
   wherein a blocking key receiving portion for supporting the blocking key is formed to the blocker ring;
   wherein the blocking key receiving portion comprises:
      support protrusions protrudingly formed in an axial direction of the shaft as a pair with a predetermined distance therebetween; and
      a receiving space formed between the support protrusions for supporting the blocking key; and
   wherein the blocking key receiving portion further comprises a protrude portion for guiding the blocking key receiving portion into the clutch hub groove.

2. The synchronizing device of claim 1, wherein the protrude portion protrudes from an outer circumference surface of the blocker ring in a radial direction thereof between the support protrusions.

3. The synchronizing device of claim 1, wherein the support protrusions comprise a slanted surface formed at inner side thereof.

4. The synchronizing device of claim 3, wherein the slanted surface is slanted in a predetermined angle with respect to a radial axis of the blocker ring.

5. The synchronizing device of claim 3, wherein the blocker key has slanted sides at a lower portion thereof in correspondence with the slanted surface of the support protrusions.

* * * * *